United States Patent
Vrancken

(10) Patent No.: US 10,458,476 B2
(45) Date of Patent: Oct. 29, 2019

(54) ROLLING ELEMENT BEARING

(71) Applicant: Aktiebolaget SKF, Gothenburg (SE)

(72) Inventor: Thomas Hubertus Theresia Vrancken, Wessem (NL)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/903,713

(22) Filed: Feb. 23, 2018

(65) Prior Publication Data

US 2018/0245639 A1    Aug. 30, 2018

(30) Foreign Application Priority Data

Feb. 28, 2017    (DE) ........................ 10 2017 203 227

(51) Int. Cl.
*F16C 33/78*      (2006.01)
*F16C 19/36*      (2006.01)
(Continued)

(52) U.S. Cl.
CPC ........ *F16C 33/7813* (2013.01); *F16C 19/364* (2013.01); *F16C 19/546* (2013.01); *F16C 33/7806* (2013.01); *F16C 33/7816* (2013.01); *F16C 33/7856* (2013.01); *F16C 33/80* (2013.01); *F16C 41/004* (2013.01);
(Continued)

(58) Field of Classification Search
CPC ........ F16C 19/06; F16C 19/364; F16C 19/38; F16C 19/546; F16C 33/3806; F16C 33/7806; F16C 33/7816; F16C 33/7856; F16C 33/7859; F16C 33/7896; F16C 33/6677; F16C 33/80; F16C 33/805; F16C 23/086; F16C 41/004; F16F 33/82; H02K 5/167; H02K 7/08; H02K 7/09;
(Continued)

(56) References Cited

U.S. PATENT DOCUMENTS 5,309,094 A * 5/1994 Rigaux ................... F16C 33/78
                                                      324/174
6,838,794 B2 * 1/2005 Iwamoto ................ F16C 9/02
                                                      310/168

(Continued)

FOREIGN PATENT DOCUMENTS

WO    WO-2012098980 A1 * 7/2012 ........ F16C 337/7816
WO    WO-2013069403 A1 * 5/2013 .......... F16C 33/6644
WO    WO-2013160098 A2 * 10/2013 ............ F16C 41/004

*Primary Examiner* — Marcus Charles
(74) *Attorney, Agent, or Firm* — Bryan Peckjian; SKF USA Inc. Patent Dept.

(57) ABSTRACT

A rolling element bearing having a first ring element, a second ring element (3), a plurality of rolling elements arranged in a space between the first and the second ring elements such that the first and the second ring elements can rotate relative each other around a rotational axle. The bearing further includes a sealing ring for sealing off a circumferential opening of the space between the first and the second ring element. The sealing ring is connected to the first ring element and further arranged to rotate relative the second ring element of the rolling element bearing. The sealing ring provides a power generating system that provides at least one pick-up element arranged to generate electrical power when the rolling element bearing rotates. The power generating system is located completely within the circumferential opening of the space.

13 Claims, 4 Drawing Sheets

(51) Int. Cl.
| | |
|---|---|
| F16C 19/54 | (2006.01) |
| H02K 5/167 | (2006.01) |
| H02K 7/09 | (2006.01) |
| H02K 7/18 | (2006.01) |
| F16C 41/00 | (2006.01) |
| G01P 3/42 | (2006.01) |
| G01P 3/44 | (2006.01) |
| G01P 3/487 | (2006.01) |
| H02K 21/24 | (2006.01) |
| H02K 7/108 | (2006.01) |
| F16C 33/80 | (2006.01) |
| F16C 33/38 | (2006.01) |
| F16C 33/66 | (2006.01) |
| F16C 19/06 | (2006.01) |
| F16C 19/38 | (2006.01) |
| F16C 23/08 | (2006.01) |

(52) U.S. Cl.
CPC .............. G01P 3/443 (2013.01); G01P 3/487 (2013.01); H02K 5/167 (2013.01); H02K 7/09 (2013.01); H02K 7/108 (2013.01); H02K 7/1846 (2013.01); H02K 21/24 (2013.01); F16C 19/06 (2013.01); F16C 19/38 (2013.01); F16C 23/086 (2013.01); F16C 33/3806 (2013.01); F16C 33/6677 (2013.01)

(58) Field of Classification Search
CPC ......... H02K 21/24; G01P 3/487; G01P 3/443; G01P 3/44; G01P 3/42
USPC .................. 384/94, 448, 484, 477, 537, 558; 324/173, 207.16, 207.25, 174
See application file for complete search history.

(56) References Cited

U.S. PATENT DOCUMENTS

| | | | | |
|---|---|---|---|---|
| 6,840,679 | B2* | 1/2005 | Lenick | F16C 35/063 384/537 |
| 6,854,893 | B2* | 2/2005 | Schmidt | F16C 13/006 384/477 |
| 6,948,856 | B2* | 9/2005 | Takizawa | F16C 19/525 384/448 |
| 7,419,040 | B2* | 9/2008 | Shiozaki | F16D 35/024 192/58.61 |
| 7,637,665 | B2* | 12/2009 | Cook | F16C 19/52 277/351 |
| 8,333,515 | B2* | 12/2012 | Milliken | F16C 33/7806 384/477 |
| 2002/0033638 | A1* | 3/2002 | Okada | B60T 8/171 303/20 |
| 2004/0105602 | A1* | 6/2004 | Mizutani | F16C 33/78 384/448 |
| 2004/0120621 | A9* | 6/2004 | Johnson | F16C 35/063 384/537 |
| 2015/0345562 | A1* | 12/2015 | Varnoux | F16C 33/768 384/484 |

* cited by examiner

ROLLING ELEMENT BEARING

CROSS-REFERENCE TO RELATED APPLICATIONS

This application claims priority to German patent application no. 102017203227.8 filed on Feb. 28, 2017, the contents of which are fully incorporated herein by reference.

TECHNICAL FIELD OF THE PRESENT INVENTION

The present invention relates to rolling element bearings. More particularly, the present invention relates to a rolling element bearing that comprises power generating means which can generate electrical power from the bearing's rotational energy.

BACKGROUND OF THE PRESENT INVENTION

Rolling element bearings are well known mechanical components which are used to e.g. support a rotating shaft or the like. There exist numerous types of rolling bearings, such as radial rolling bearings which are used to mainly support radial loads, axial rolling bearings which are used to mainly support axial loads, and also rolling bearings which are used to support a combination of radial and axial loads. The bearings may also be provided with seals to seal off the space in which the rolling elements are located. A sealed rolling bearing will be able to prevent dirt, debris etc. from entering the bearing and also the seals may be used to accommodate a lubricant in the bearing. The lubricant may e.g. be oil or grease.

Furthermore, in some occasions, there is a need to equip the bearings with certain functionalities that requires electrical power. For example, the bearings may be equipped with electronic sensors to sense a condition of the bearing, such as vibration, temperature, speed etc. In addition, there may be a need to e.g. equip the bearing with wireless transmitters/receivers, lubrication systems etc., which also would require electrical power. Electrical power can be provided from an external source, a battery etc., but it could also be generated by making use of the rotational energy from the bearing.

BRIEF SUMMARY OF THE PRESENT INVENTION

In view of the above, an object of the present invention is to provide an improved rolling element bearing that eliminates or alleviates at least one of the drawbacks of the prior art. More particularly, an object of the present invention is to provide an improved sealed rolling element bearing that comprises a power generating functionality.

These and other objects have been achieved by the subject matter as specified in the independent claim. Advantageous embodiments can be found in the dependent claims and in the accompanying description and drawings.

The present invention relates to a rolling element bearing, which comprises, a first ring element and a second ring element, a plurality of rolling elements arranged in a space in-between the first and the second ring elements such that the first and the second ring elements can rotate relative each other around a rotational axle. Furthermore, the bearing comprises a sealing ring for sealing off a circumferential opening of the space between the first and the second ring element, wherein the sealing ring is connected to the first ring element and further arranged to rotate relative the second ring element during use of the rolling element bearing. The sealing ring comprises a power generating means which presents at least one pick-up element arranged to generate electrical power when the rolling element bearing rotates. Further, the power generating means is located completely within, or inside, the circumferential opening of the space.

Recognized advantages of the present invention are for example: the rolling element bearing will be provided with a sealing function and a power harvesting function at the same time, the power harvesting function and the sealing function will be provided within the standard dimensions of the bearing, the power harvesting function and the sealing function can be provided within an ISO standard dimension of the bearing, and no need to make geometrical changes to the bearing.

In previous designs, when a power generating function has been provided for a sealed rolling bearing, either the seal has been removed to make room for the power generating device, there has been made holes/apertures in the seal to introduce power generators therein, or the power generator has been located outside the outer dimensions of the bearing and the space in which the rolling elements are located. This would thus impair the sealing function of the bearing and/or increase the size of the bearing. With the present invention, this can be avoided and thereby an improved sealed bearing with a power generating function has been provided.

In an embodiment, in a cross sectional view of the bearing, wherein the cross section is defined by a plane in which the rotational axle of the bearing is present, the location of the circumferential opening is defined by a line that intersects the outer boundary limits of the first and the second ring elements. In a further embodiment, the line is a straight line.

According to an embodiment of the present invention, the at least one pick-up element is facing a magnetic ring comprising an alternating polarity in its circumference.

According to an embodiment of the present invention, the magnetic ring is connected to the second ring element. Optionally, the magnetic ring may be integrated into the second ring element or it may be positioned in a circumferential groove in the second ring element. Further optionally, the magnetic ring may be attached to an additional element, such as an additional sealing ring which in turn is attached to the second ring element.

According to an embodiment of the present invention, the at least one pick-up element is a coil. Preferably, the coil may be made of a copper wire.

According to an embodiment of the present invention, the sealing ring is a lip seal ring presenting at least one sealing lip portion that is in contact with the second ring element. According to a further embodiment, the sealing lip portion is in contact with the magnetic ring or the sealing lip portion is facing the magnetic ring on the second ring element. Thus, the sealing functionality may be accomplished between the seal lip portion and the magnetic ring. This may be advantageous since it would provide a compact solution that also leads to a good sealing performance. Further optionally, the at least one pick-up element is located in the vicinity of the sealing lip portion, which may further reduce the size of the seal, but also it may increase the power generating function, i.e. a smaller air gap between the pick-up element and the magnetic ring would increase the electrical output from the pick-up element. In a further embodiment, the at least one pick-up element is located in the seal lip portion, thereby achieving a compact design and increased power output.

According to an embodiment of the present invention, the sealing ring comprises a carrier ring and a sealing portion, such as a seal lip portion, attached to the carrier ring, wherein the at least one pick-up element is connected to the carrier ring. The carrier ring may e.g. be made of a plastic material or metal, such as sheet metal.

According to an embodiment of the present invention, the sealing ring is connected to the first ring element via a circumferential groove in the first ring element. Preferably, the sealing ring may be connected to the first ring element by a snap fit connection in said groove.

According to an embodiment of the present invention, the sealing ring comprises a plurality of pick-up elements arranged in the circumference of the sealing ring. For example, the sealing ring may be equipped with several pick-up elements arranged in a sector of the circumference of the sealing ring, such as three, four, five or six pick-up elements. In a further embodiment, there are pick-up elements around the complete circumference of the sealing ring.

According to an embodiment of the present invention, the magnetic ring is embedded in a lubrication resistant material, thereby avoiding that the magnetic function is reduced during use of the bearing.

According to an embodiment of the present invention, the power generating means is connected to and arranged to give power to at least one of an electrical sensor, a wireless transmitter/receiver, a lubrication system, a processor, a computer, a computer readable memory etc.

According to an embodiment of the present invention, the at least one pick-up element is completely embedded in the sealing ring, i.e. sealing ring material is present on all sides around the at least one pick-up element. This would lead to a compact design, and also it would prevent any dirt, debris, oil, grease etc. from coming in contact with the at least one pick-up element. Thus, a completely integrated pick-up element would lead to an increased reliability of the power generating functionality.

According to an embodiment of the present invention, the sealing ring is part of a ring-formed shield for sealing off the circumferential opening of the space between the first and the second ring element.

According to an embodiment of the present invention, the ring-formed shield further comprises an additional sealing ring which is attached to the second ring element.

According to an embodiment of the present invention, a magnetic ring is connected to the additional sealing ring of the ring-formed shield.

The rolling element bearing may be any kind of bearing, such as a ball bearing, a roller bearing, a deep groove ball bearing, an angular contact ball bearing, a spherical roller bearing, a cylindrical roller bearing, a tapered roller bearing, a toroidal roller bearing etc. In a preferred embodiment, the rolling element bearing is a radial bearing that presents a circumferential opening on one axial side of the bearing as seen in relation to the rotational axle of the bearing.

It shall be noted that any one of the embodiments mentioned herein regarding the present invention may be combined with any one of the other embodiments disclosed herein unless expressed to the contrary.

BRIEF DESCRIPTION OF THE DRAWINGS

Exemplifying and preferred embodiments of the present invention will now be described more in detail, with reference to the accompanying drawings, wherein.

Figure 1:
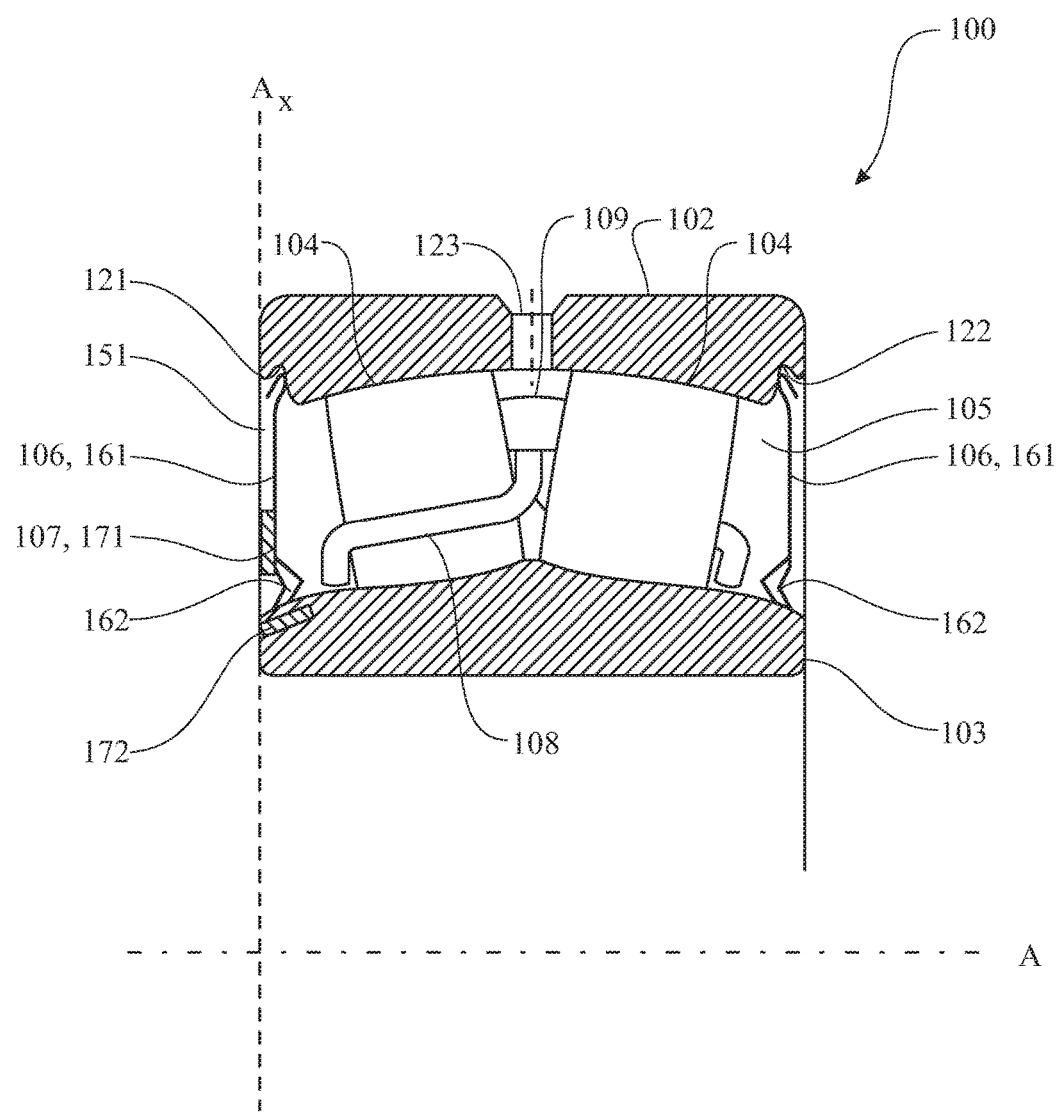
FIG. 1 presents a rolling element bearing according to an embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention.

DETAILED DESCRIPTION OF THE PRESENT INVENTION

FIG. 1 shows a cross sectional view of a spherical roller bearing 100 according to an embodiment of the present invention. A spherical roller bearing 100 is characterized by its spherical raceways and roller configuration which leads to that the outer ring 102 (first ring element) and the inner ring 103 (second ring element) can be relatively misaligned in relation to the rotational axle A. In addition, a spherical roller bearing is a radial roller bearing which is designed to accommodate large radial loads, but it can also accommodate loads in the axial direction. The bearing comprises a plurality of spherical roller elements 104 arranged in two rows in a space 105 in-between the outer and the inner ring, 102 and 103 respectively, such that the inner and the outer ring elements can rotate relative each other around the rotational axle A. Furthermore, the bearing 100 comprises a sealing ring 106 on the left-hand side of the figure for sealing off a circumferential opening 151 of the space 105 between the outer and the inner ring element, wherein the sealing ring 106 is connected to the outer ring element 102 via a circumferential groove 121 and further arranged to rotate relative the inner ring element 103 during use of the rolling element bearing 100.

The bearing 100 further comprises an additional sealing ring element 106 on the right-hand side of the drawing which also is fitted into a circumferential groove 122 on the outer ring 102. Thereby the two sealing rings 106 will completely enclose the space 105. The two sealing rings 106 present carrier rings 161 and sealing lip portions 162. The carrier rings 161 are in this embodiment made of a plastic material, but they could also be made of e.g. sheet metal. The sealing ring 106 on the left-hand side comprises a power generating means 107 which presents at least one pick-up element 171 arranged to generate electrical power when the rolling element bearing 100 rotates, and the power generating means 107 is located completely within the circumferential opening 151 of the space 105. Thus, the power generating means 107 is located within a line Ax which intersects the axially outer boundary limit of the inner and the outer ring, 102 and 103 respectively, as can be seen in the figure. In addition, the power generating means 107 further presents a magnetic ring 172 which is attached to the inner ring 103. In this embodiment, the magnetic ring 172 is located such that the seal lip portion 162 of the sealing ring 106 is facing the magnetic ring 172, thus accomplishing a compact and reliable design. The spherical roller bearing 100 further comprises a cage 108 (also known as a retainer) for separating the roller elements 104 and a guide ring 109 for guiding the rollers 104. On the outer ring a radially extending lubrication bore 123 can also be seen. The pick-up element 171 is in this embodiment completely encapsulated in the carrier ring 161. Thereby it will not be negatively affected by lubricant (e.g. grease) in the space 105 and/or by external debris, contaminants etc.

Figure 2:
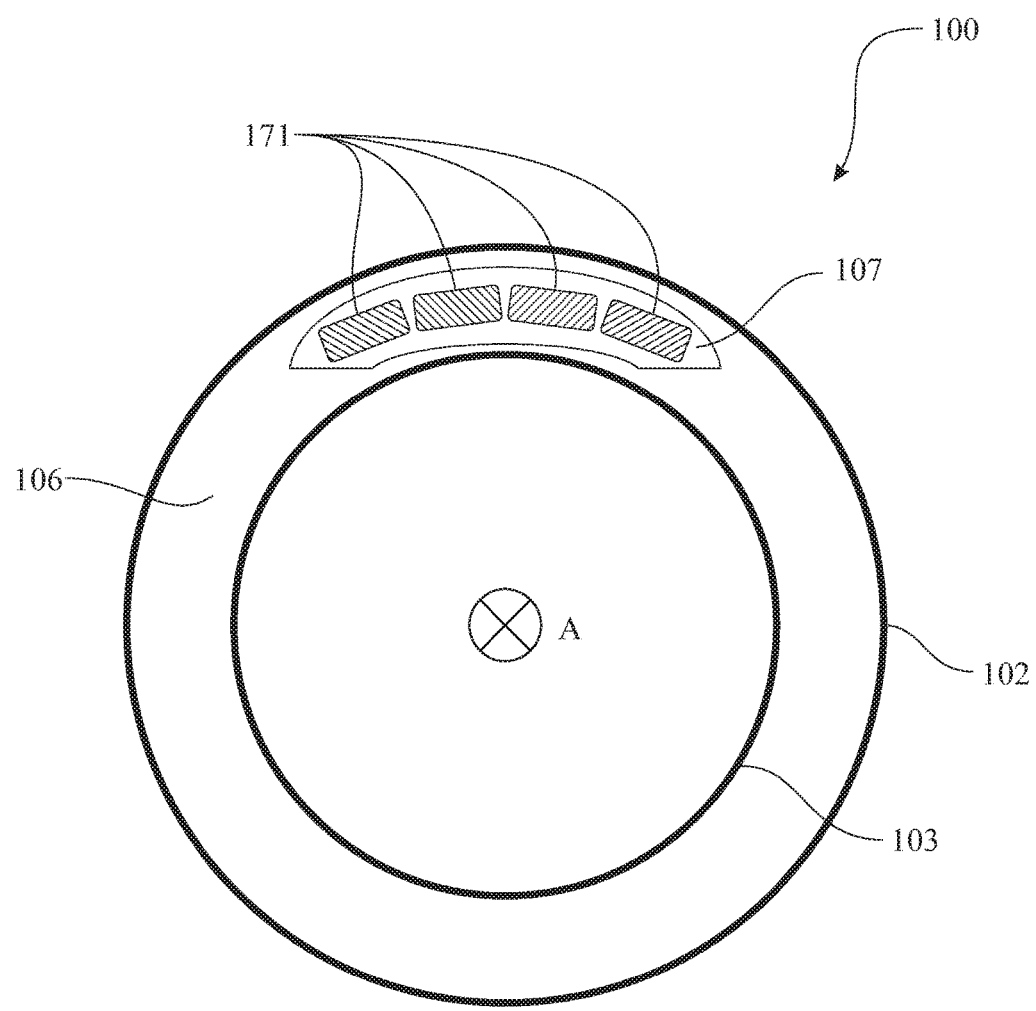
FIG. 2 presents a rolling element bearing seen from an axial side view according to an embodiment of the present invention.

FIG. 2 shows a side view of a rolling element bearing 100 according to an embodiment of the present invention. As can be seen, the side view is represented by a plane being perpendicular to a rotational axle A of the bearing 100. The bearing 100 comprises an outer ring 102 (first ring) and an inner ring 103 (second ring) and a plurality of rolling elements (not shown in this figure). In addition, the bearing 100 comprises a sealing ring 106. The sealing ring 106 comprises a power generating means 107, which in this embodiment presents four coils 171 arranged in a sector of the circumference of the sealing ring 106. The coils 171 are located on a plastic board 107 which in turn is connected to the sealing ring 106. The board may be completely integrated into the sealing ring 106, and further the power generating means 107 is located completely within the circumferential opening 151 of the bearing's internal space. On the inner ring 103 is a magnetic ring (not shown) connected that is configured with an alternating polarity. When the inner ring 103 rotates relative the sealing ring 106 an alternating magnetic field will be exerted onto the coils 171, which in turn will generate electrical power. The power generated can be used for e.g. powering a sensor, a wireless transmitter/receiver etc. as already described herein.

Figure 3A:
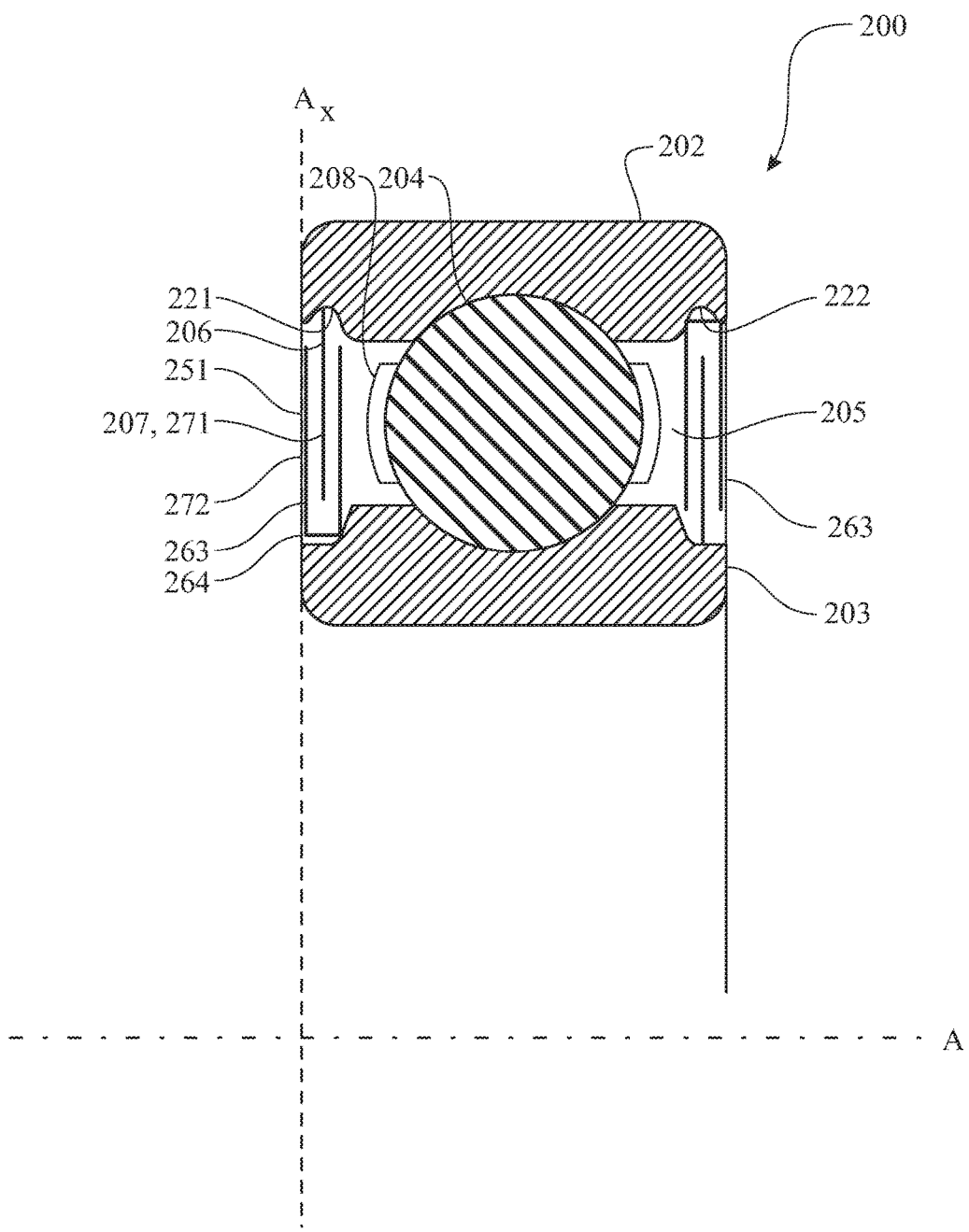
FIG. 3A presents a rolling element bearing according to another embodiment of the present invention.

With reference to FIG. 3A, a rolling element bearing 200 according to another embodiment of the present invention can be seen in a cross-sectional view. The bearing 200 is a deep groove ball bearing, even though also this embodiment of the invention is by no means limited to such a rolling element bearing. The bearing 200 comprises a plurality of balls 204 arranged in one row in a space 205 in-between the outer and the inner ring, 202 and 203 respectively, such that the inner and the outer ring elements can rotate relative each other around the rotational axle A. Furthermore, the bearing 200 comprises a sealing ring 206 on the left-hand side of the figure for sealing off a circumferential opening 251 of the space 205 between the outer and the inner ring element, wherein the sealing ring 206 is connected to the outer ring element 202 via a circumferential groove 221 and further arranged to rotate relative the inner ring element 203 during use of the rolling element bearing 200. The sealing ring 206 is part of a ring-formed shield element 263 which also comprises an additional sealing ring 264. The two sealing rings, 206 and 264 respectively, are arranged in a labyrinth configuration to seal off the space 205.

The additional sealing ring 264 is connected to the inner ring 203. The bearing 200 further comprises an additional ring-formed shield 263 on the right-hand side of the drawing which also is fitted into a circumferential groove 222 of the outer ring 202. Thereby the two sealing shields 263 will completely enclose the space 205. The sealing ring 206 on the left-hand side comprises a power generating means 207 which presents at least one pick-up element 271 arranged to generate electrical power when the rolling element bearing 200 rotates, and the power generating means 207 is located completely within the circumferential opening 251 of the space 205. Thus, the power generating means 207 is located within a line Ax which intersects the axially outer boundary limit of the inner and the outer ring, 202 and 203 respectively, as can be seen in the figure. In addition, the power generating means 207 further presents a magnetic ring 272 which is attached to the additional sealing ring 264 of the ring-formed shield 263. In this embodiment, the magnetic ring 272 and the pick-up elements 271 are arranged essentially parallel to the rotational axle A, in contrast to the configuration in FIG. 200 where the magnetic ring 272 and the pick-up elements 271 are essentially arranged perpendicular to the rotational axle A.

Figure 3B:
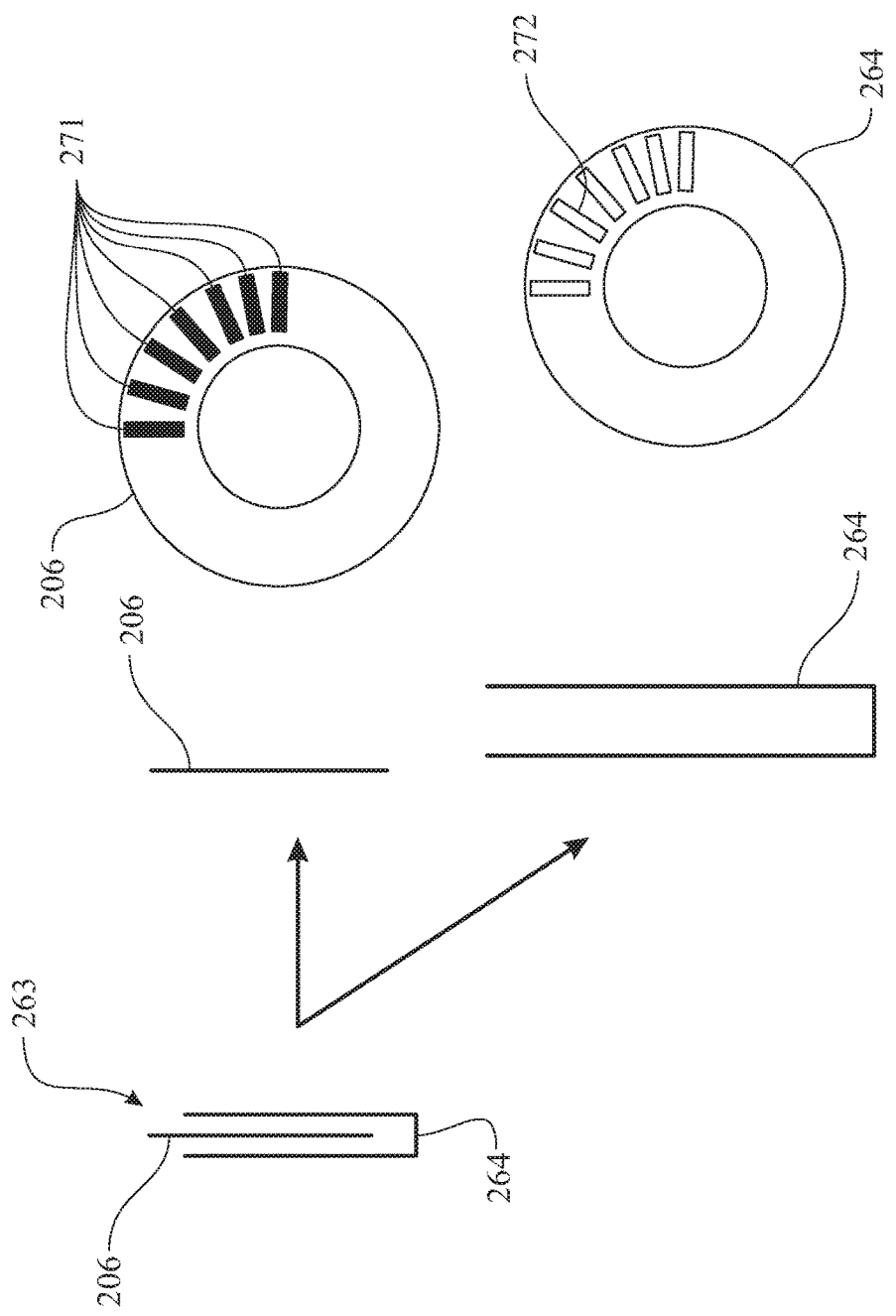
FIG. 3B presents a detailed view of a ring-formed shield according to an embodiment of the invention.

A further detailed view of the ring-formed shield 263 can be seen in FIG. 3B. The deep groove ball bearing 200 further comprises a cage 208 (also known as a retainer) for separating the balls 204. The power generating means 207 can be completely encapsulated in the ring-formed shield element 263. Thereby the power generating means 207 will not be negatively affected by e.g. lubricant from the bearing or external debris, dirt etc. Even though the power generating means 207 is located completely within the circumferential opening 251 and thereby enables a compact and reliable design, still there can be other components, such as electrical wiring etc., which are connected to the power generating means and which may be located outside the circumferential opening 251.

Now turning to FIG. 3B, a more detailed view of a ring-formed shield element 263 can be seen. The shield 263 comprises a first sealing ring 206 and a second sealing ring 264. Further, a side view of the respective sealing rings, 206 and 264, can also be seen. For the sealing ring 206, a plurality of pick-up elements 271 are arranged in the circumference of the sealing ring 206. The pick-up elements 271 are in this embodiment coils. On the second sealing ring 264 a magnetic ring 272 can be seen which presents a number of alternating polarities arranged in the circumference of the ring. When the sealing ring 206 rotates relative the second sealing ring 264 electrical power will be generated in the coils 271 due to the varying magnetic field that will be exerted onto said coils. The configuration of the coils and magnetic rings could likewise be made by fitting coils onto the second sealing ring 264 and the magnetic ring on the first sealing ring 206.

The invention is not limited to the embodiments described herein. It would be evident for the skilled person that other embodiments and modifications to the embodiments specified hereinabove are also possible within the scope of the claims. For example, it is evident that the configuration of the generator, i.e. the pick-up element and the magnetic ring also is reversible. In other words, the magnetic ring could likewise be positioned on the outer ring and consequently there could be a relative rotation between the outer ring and the sealing ring for generating electrical power. In addition, even though the above embodiments in FIGS. 1, 2 and 3 have only shown a power generating means on one side of the bearing, also the other side could be equipped with a power generating means with a configuration according to the present invention.

What is claimed is:

1. A rolling element bearing comprising:
   a first ring element and a second ring element;
   a plurality of rolling elements arranged in a space disposed between the first ring element and the second ring element such that the first ring element and the second ring element can rotate relative to each other around a rotational axle;
   a sealing ring for sealing off a circumferential opening of the space between the first ring element and the second ring element, wherein the sealing ring is connected to the first ring element and further arranged to rotate relative to the second ring element of the rolling element bearing; and a power generating mean assembly that provides element integral with the sealing ring, wherein the power generating element includes at least one electro-magnetic pick-up element arranged to generate electrical power when the rolling element bearing rotates, wherein the power generating assembly being located completely within the circumferential opening of the space and oriented facing an axial direction.

2. The rolling element bearing according to claim 1, wherein the at least one electro-magnetic pick-up element is arranged facing a magnetic ring that provides an alternating polarity in its circumference.

3. The rolling element bearing according to claim 2, wherein the magnetic ring is connected to the second ring element.

4. The rolling element bearing according to claim 3, wherein the sealing lip portion is in contact with the magnetic ring.

5. The rolling element bearing according to claim 1, wherein the at least electro-magnetic one pick-up element is a coil.

6. The rolling element bearing according to claim 1, wherein the sealing ring is a lip seal ring providing at least one sealing lip portion that is in contact with the second ring element.

7. The rolling element bearing according to claim 6, wherein the at least one pick-up element is located in the vicinity of the sealing lip portion.

8. The rolling element bearing according to claim 1, wherein the sealing ring comprises a carrier ring and a sealing portion attached to the carrier ring, and wherein the at least one electro-magnetic pick-up element is connected to the carrier ring.

9. The rolling element bearing according to claim 1, wherein the sealing ring is connected to the first ring element via a circumferential groove in the first ring element.

10. The rolling element bearing according to claim 1, wherein the sealing ring comprises a plurality of electro-magnetic pick-up elements arranged in the circumference of the sealing ring.

11. The rolling element bearing according to claim 1, wherein the sealing ring is part of a ring-formed shield for sealing off the circumferential opening of the space between the first ring element and the second ring element.

12. The rolling element bearing according to claim 11, wherein the ring-formed shield further comprises an additional sealing ring that is attached to the second ring element.

13. The rolling element bearing according to claim 12, wherein a magnetic ring is connected to the additional sealing ring of the ring-formed shield.

* * * * *